(12) United States Patent
Kaneda et al.

(10) Patent No.: US 6,499,807 B1
(45) Date of Patent: Dec. 31, 2002

(54) SEAT BACK FRAME ASSEMBLY OF VEHICLE SEAT

(75) Inventors: Takuji Kaneda, Tochigi-ken (JP);
Kanenori Sato, Tochigi-ken (JP);
Misao Omori, Tochigi-ken (JP)

(73) Assignee: Ts Tech Co., Ltd., Saitama-ken (JP)

( * ) Notice: Subject to any disclaimer, the term of this patent is extended or adjusted under 35 U.S.C. 154(b) by 248 days.

(21) Appl. No.: 09/890,397

(22) PCT Filed: Nov. 28, 2000

(86) PCT No.: PCT/JP00/08371
§ 371 (c)(1),
(2), (4) Date: Jul. 30, 2001

(87) PCT Pub. No.: WO01/39632
PCT Pub. Date: Jun. 7, 2001

(30) Foreign Application Priority Data

Nov. 29, 1999 (JP) ............................................. 11-337287

(51) Int. Cl.[7] ................................................ A47C 7/30
(52) U.S. Cl. ............................ 297/452.52; 297/452.49; 297/452.54
(58) Field of Search ........................ 297/452.52, 452.49, 297/452.53, 452.54, 452.63

(56) References Cited

U.S. PATENT DOCUMENTS 2,177,363 A * 10/1939 Flint ................. 297/452.52 X
3,034,829 A * 5/1962 Flint ................. 297/452.52 X
3,639,002 A * 2/1972 Tischler ................. 297/452.52
4,697,848 A * 10/1987 Hattori et al. ...... 297/452.52 X
4,796,954 A 1/1989 Saito
5,044,693 A 9/1991 Yokota
5,193,881 A 3/1993 Minai
5,490,718 A * 2/1996 Akizuki et al. ...... 297/452.52 X

FOREIGN PATENT DOCUMENTS

| DE | 3613-763 A | * 10/1986 | ............ 297/452.52 |
| JP | 61-226340 A | * 10/1986 | ............ 297/452.52 |
| JP | 1-99265 | 7/1989 | |
| JP | 3-64545 | 6/1991 | |
| JP | 6-1174 A | 1/1994 | |
| JP | 7-59630 A | 3/1995 | |
| JP | 11-348628 A | 12/1999 | |

* cited by examiner

Primary Examiner—Rodney B. White
(74) Attorney, Agent, or Firm—Browdy and Neimark

(57) ABSTRACT

A seat back frame assembly of the invention has side frame members (17, 17), an upper frame member (18), a lower frame member (19) and zigzag spring (15) mounted between the side frame members (17, 17). A side portion (27) of the lower frame member has a main connection portion (28) and a sub-connection portion (29), both of which are fixed to the side frame member (17). The main connection portion (28) is positioned below the zigzag spring (15). The sub-connection portion (29) is inclined toward a front upper side so that the sub-connection portion and the zigzag spring are at least partly overlapped with each other in a front-and-back direction.

5 Claims, 5 Drawing Sheets

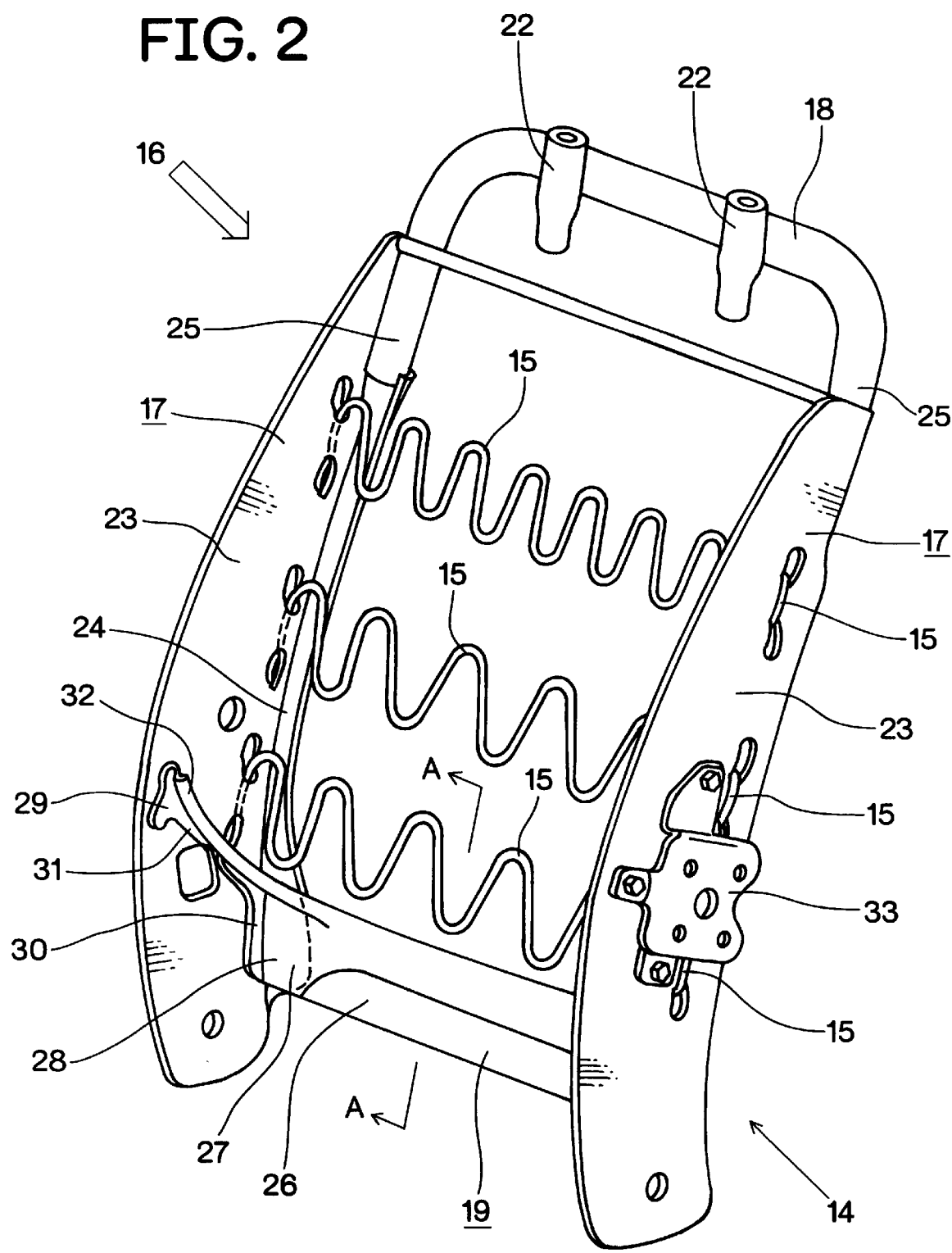

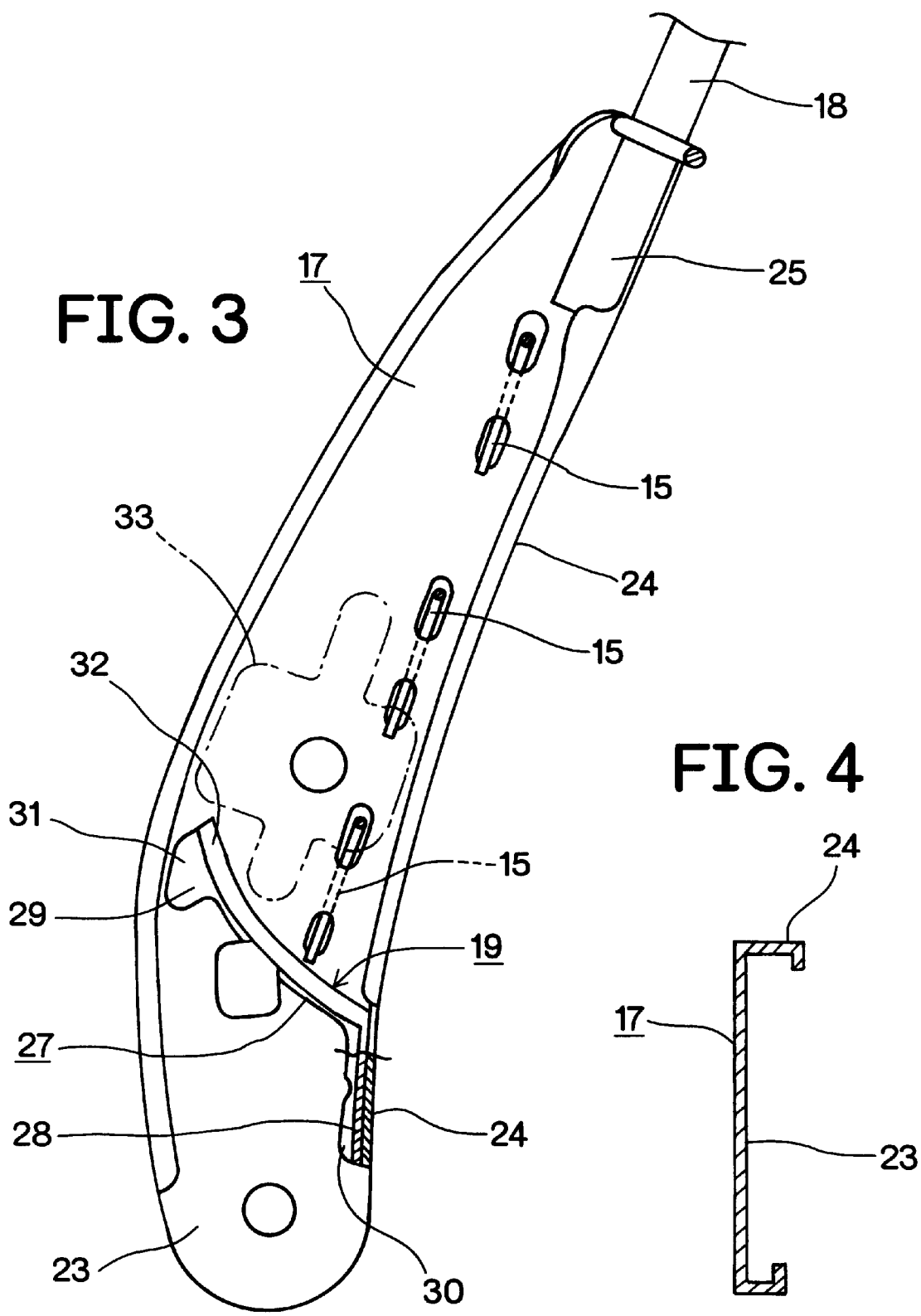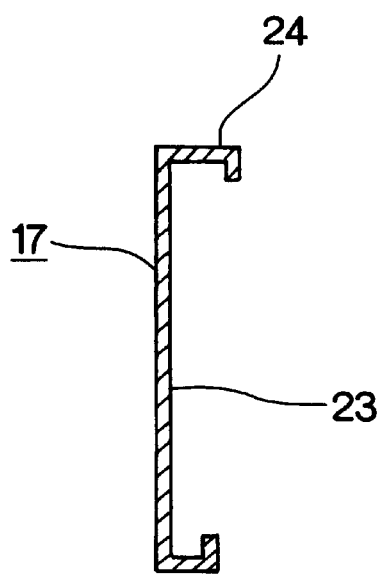

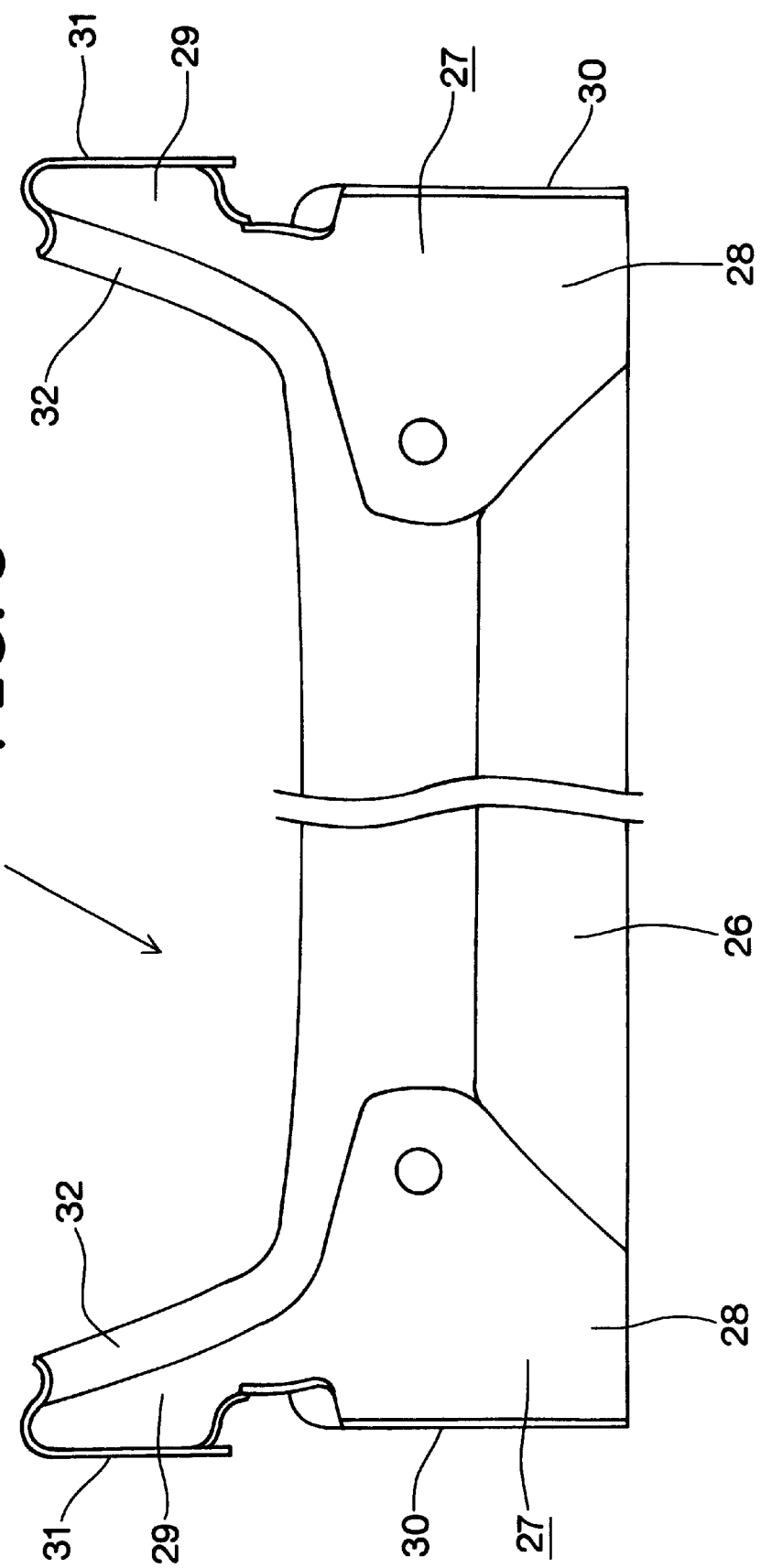

SEAT BACK FRAME ASSEMBLY OF VEHICLE SEAT

The present application is the national stage under 35 U.S.C. §371 of international application PCT/JP00/08371, filed Nov. 28, 2000 which designated the United States, and which application was not published in the English language.

TECHNICAL FIELD OF THE INVENTION

The present invention relates to a seat back frame assembly of a vehicle seat, and more particularly to a reinforced framework of a frame assembly.

BACKGROUND OF THE INVENTION

U.S. Pat. No. 4,796,954 discloses a seat back frame assembly of a vehicle seat. The frame assembly comprises a framework constituted by side frame members extending in a vertical direction, an upper frame member connecting upper ends of the side frame members and a lower frame member connecting lower ends of the side frame members, and zigzag springs provided between the side frame members.

The said first conventional assembly has an advantage capable of being formed light and an advantage capable of providing an improved comfort. However, the conventional assembly has a disadvantage of providing a low torsional rigidity. A torsional external force is strongly applied to a bonding portion between the side frame members and the lower frame member. For example, when a child sits on an armrest mounted to the side frame member, the bonding portion has to support the side frame member so as not to bend toward an front outer side with respect to the lower frame member.

U.S. Pat. No. 5,044,693 discloses a seat back frame assembly having a bracket mounted to the side frame member. However, the bracket of the second conventional assembly has no function of reinforcing the bonding portion between the side frame member and the lower frame member.

U.S. Pat. No. 5,193,881 discloses a seat back frame assembly provided with a center plate member, side plate members angled to extend forward from both sides of the center plate member, and reinforcing members reinforcing corner portions between the center plate member and the side plate members.

Since the third conventional frame assembly is constituted by the plates as a whole, the third conventional frame assembly has a higher rigidity than that of the first and second conventional assemblies. Further, the reinforcing member of the third conventional assembly is expected to further increase a rigidity of the framework. However, the third conventional assembly has a disadvantage of having a very heavy weight and a disadvantage of having a low comfort. In order to obtain an excellent comfort, it is necessary to support a seat back cushion by zigzag springs as described in the first conventional assembly. An immovable center plate member reduces a comfort.

BRIEF SUMMARY OF THE INVENTION

An object of the present invention is to improve a rigidity of a seat back frame assembly without deteriorating a comfort obtained by zigzag springs.

This object can be achieved by a seat back frame assembly for a vehicle seat which is comprised of a pair of right and left side frame members extending in a vertical direction of the vehicle seat, an upper frame member connecting upper end portions of the side frame members to each other, a lower frame member connecting lower end portions of the side frame members to each other, spring means having an upper zigzag spring and a lower zigzag spring mounted between the side frame members, each of said side frame members having a main plate extending in a front-and-back direction of the vehicle seat and a sub-plate extending to an inside from a rear edge of the main plate, said lower frame member having a center portion and side portions positioned in both sides of the center portion, each of said side portions having a main connection portion extending to an outside from the center portion and a sub-connection portion integrally formed with the main connection portion, an outer end of said main connection portion being fixed to the main plate, an outer end of said sub-connection portion being fixed to the main plate, said sub-connection portion being inclined toward a front upper side so that the sub-connection portion and the lower zigzag spring are at least partly overlapped with each other in the front-and-back direction.

BRIEF DESCRIPTION OF THE DRAWINGS

FIG. 2 is a perspective view of a frame assembly of a seat back for the vehicle seat;

FIG. 3 is a vertical cross sectional side elevational view of the frame assembly;

FIG. 4 is a horizontal cross sectional view of a side frame member of the frame assembly;

FIG. 5 is a partly notched front elevational view of a lower frame member of the frame assembly;

BEST MODE FOR CARRYING OUT THE INVENTION

Figure 1:
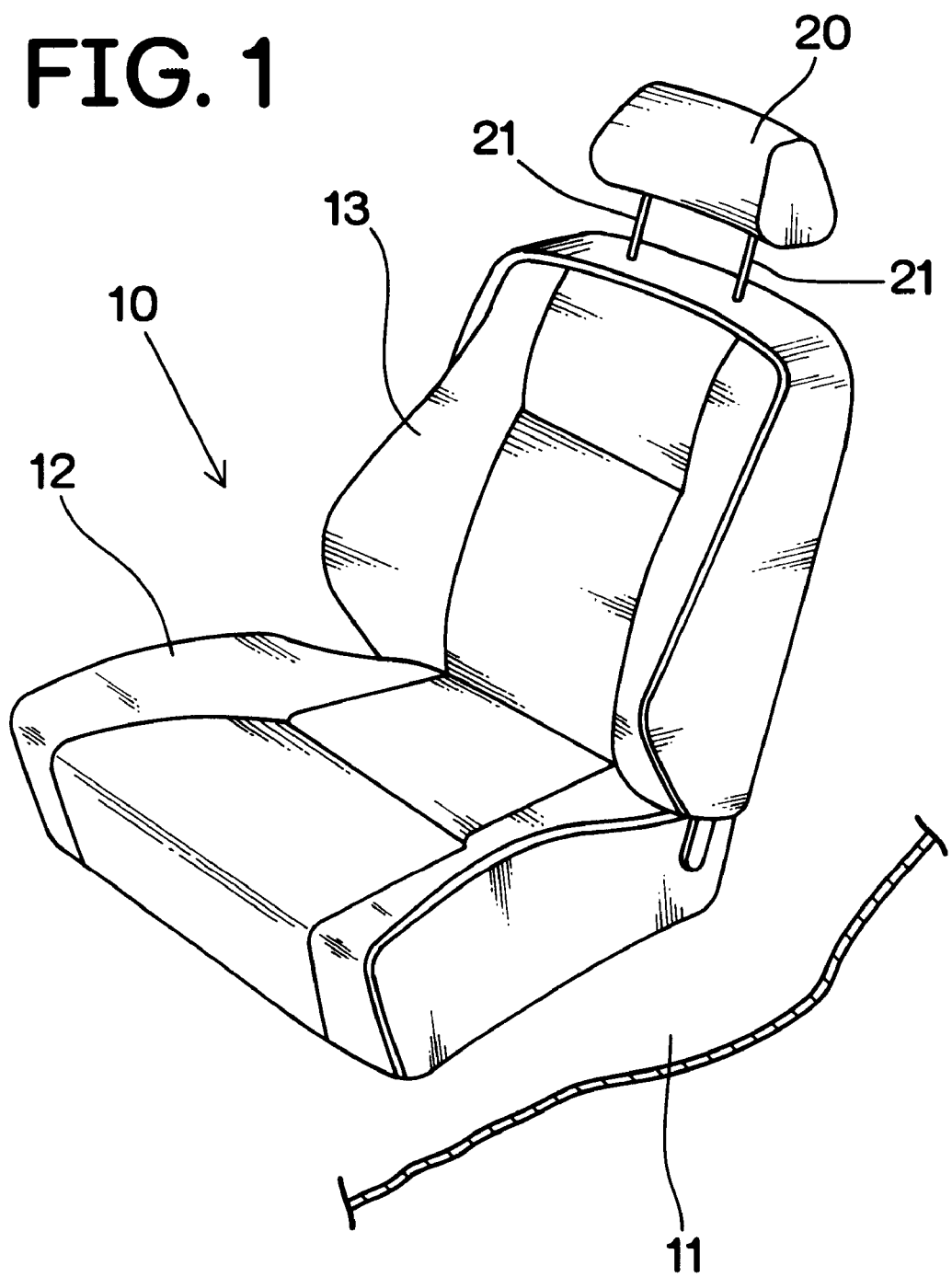
FIG. 1 is a perspective view of a vehicle seat in accordance with the present invention.

A description will be given of an embodiment in accordance with the present invention with reference to the accompanying drawings. A vehicle seat 10 in accordance with the present invention has a seat bottom 12 slidably mounted to a vehicle body 11 and a seat back 13 rotatably supported to the seat bottom 12.

FIG. 2 shows a frame assembly 16 of the seat back 13 having a rectangular metal framework 14 and a plurality of zigzag springs 15, 15. The framework 14 is substantially provided with a pair of side frame members 17, 17 extending in a vertical direction, an inverse U-shaped upper frame member 18 connecting upper ends of the side frame members 17, 17, and a lower frame member 19 connecting lower ends of the side frame members 17, 17. The upper frame member 18 is fixedly provided with holders 22, 22 which receive stays 21, 21 of a headrest 20 of the seat back 13.

Each of the side frame members 17, 17 is formed in a substantially L shape as shown in FIG. 4, and comprises a main plate 23 extending in a front-and-back direction of the seat 10 and a sub-plate 24 angled to extend to the inside from a rear edge of the main plate 23. Lower end portions of the main plates 23, 23 are connected to a framework of the seat bottom 12 via a reclining mechanism (not shown). The zigzag springs 15, 15 are mounted between middle portions of the main plates 23, 23.

Longitudinal side portions 25, 25 of the upper frame member 18 are respectively fixed to the side frame members 17, 17 so as to be half surrounded by the main plates 23, 23 and the sub-plates 24, 24.

The lower frame member 19 comprises a center portion 26 and side portions 27, 27 positioned at both sides of the center portion 26. The center portion 26 is provided at a position coinciding with the sub-plate 24 or the rear end edge of the side frame member 17 in the vertical direction, as well shown in FIG. 6. Further, the center portion 26 is positioned at a further lower portion from the zigzag spring 15 positioned at the lowermost portion.

Figure 6:
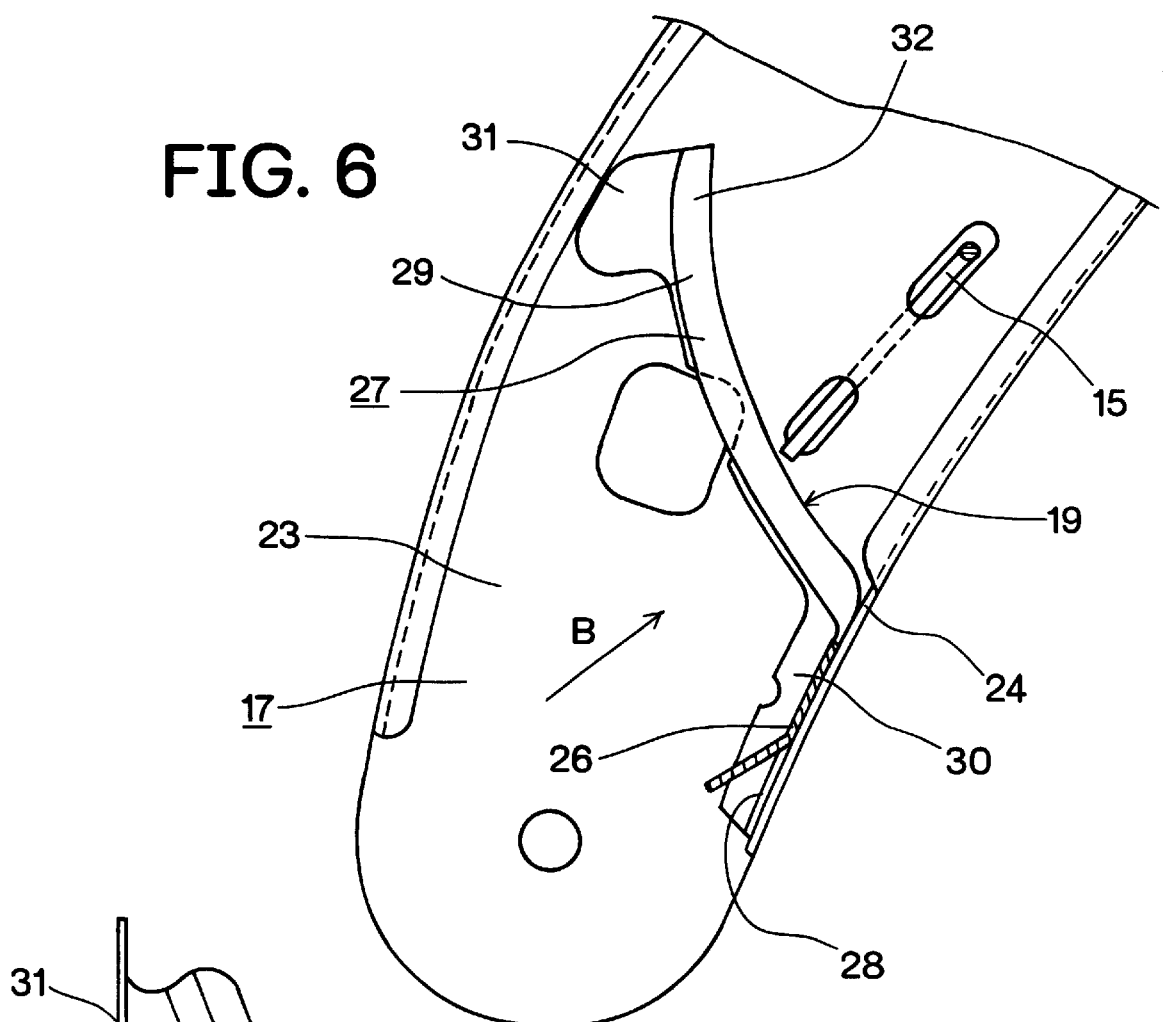
FIG. 6 is a vertical cross sectional view along a line A—A in FIG. 2.

Each of the side portions 27, 27 has a main connection portion 28 extending to the outside from the center portion 26 and a sub-connection portion 29 expanding substantially upward from the main connection portion 28. A back surface of the main connection portion 28 is fixed to the sub-plate 24 of the side frame member 17 by welding means or bolt-nut means, as shown in FIGS. 3 and 6. An outer side edge of the main connection portion 28 is angled to extend forward for forming a vertical main joint surface 30. The main joint surface 30 is fixed to the main plate 23 by welding means or bolt-nut means.

Figure 7:
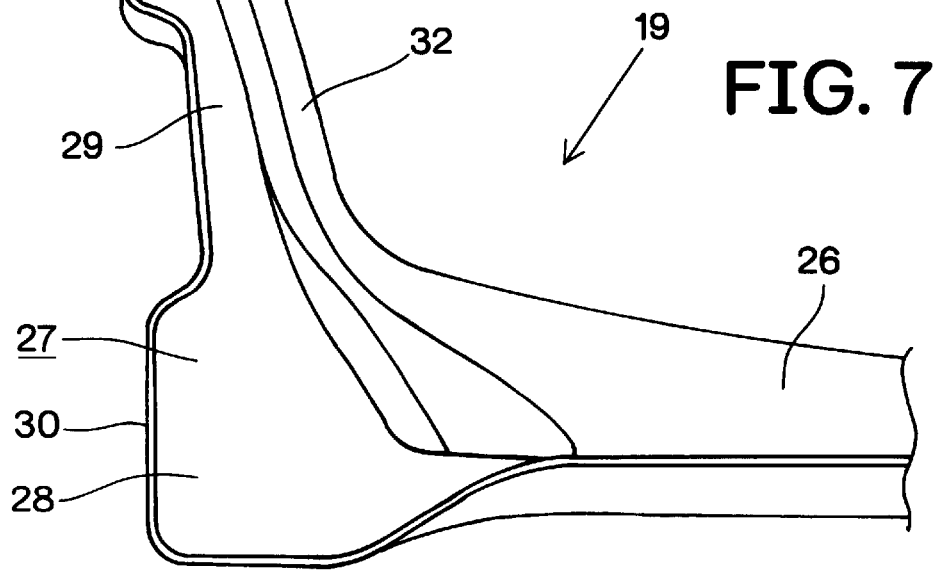
FIG. 7 is a partly enlarged view of the lower frame member as seen from an arrow B in FIG. 6.

The sub-connection portion 29 is inclined so as to be higher as going outside, as well shown in FIG. 7. Further, the sub-connection portion 29 is inclined toward a front upper side as shown in FIG. 6. Due to this incline, the sub-connection portion 29 is at least partly overlapped with the zigzag spring 15 positioned at the lowermost portion in the front-and-back direction.

An outer side edge of the sub-connection portion 29 is bent to extend to a front lower side for forming an inclined sub-joint surface 31. The sub-joint surface 31 is also fixed to the main plate 23 by welding means or bolt-nut means. A reinforcing rib 32 is formed on the inner portion of the sub-connection portion 29.

A base 33 which supports an armrest (not shown) is fixed to an outer surface of one of the main plates 23 and 23 of the side frame members 17 and 17. A part of the base 33 is overlapped with the sub-connection portion 29 in the front-and-back direction.

The lower frame member 19 is preferably formed in one-piece by a metal material. However, it is possible to form the side portions 27 and 27 in such a manner as to be separated from the center portion 26.

EFFECT OF THE INVENTION

The frame assembly 16 in accordance with the present invention leads to many advantages, as described below.

The metal framework 14 constituted by the side frame members 17, 17, the upper frame member 18 and the lower frame member 19 is basically provided with a feature of a lightweight.

The zigzag springs 15, 15 mounted between the side frames 17, 17 achieve a good comfort.

Since the center portion 26 of the lower frame member 19 is positioned at the further lower portion from the zigzag spring 15 positioned at the lowermost portion, the mounting place of the zigzag spring 15 is not limited.

The sub-connection portion 29 of the side portion 27 in the lower frame member 19 is inclined so as to be higher as going outside and further inclined toward the front upper side. Due to this incline, the sub-connection portion 29 can be at least partly overlapped with the zigzag spring 15 positioned at the lowermost portion in the front-and-back direction without limiting the mounting place of the zigzag spring 15. Accordingly, it is possible to arrange the zigzag spring 15 at the lowermost position just near the center portion 26 of the lower frame member 19.

The sub-connection portion 29 extending to the front upper side can effectively resist against a torsional external force applied to the side frame member 17. In particular, it is possible to more effectively resist against the torsional external force applied to the side frame 17 by overlapping the sub-connection portion 29 with the armrest supporting base 33 in the front-and-back direction.

What is claimed is:

1. A seat back frame assembly for a vehicle seat comprising:

a pair of right and left side frame members extending in a vertical direction of the vehicle seat:

an upper frame member connecting upper end portions of the side frame members to each other;

a lower frame member connecting lower end portions of the side frame members to each other;

spring means having an upper zigzag spring and a lower zigzag spring mounted between the side frame members;

each of said side frame members having a main plate extending in a front-and-back direction of the vehicle seat and a sub-plate extending to an inside from a rear edge of the main plate;

said lower frame member having a center portion and side portions positioned at both sides of the center portion;

each of said side portions having a main connection portion extending to an outside from the center portion and a sub-connection portion integrally formed with the main connection portion;

wherein an outer end of said main connection portion is fixed to the main plate;

wherein an outer end of said sub-connection portion is fixed to the main plate;

wherein said sub-connection portion is inclined toward a front upper side so that the sub-connection portion and the lower zigzag spring are at least partly overlapped with each other in the front-and-back direction.

2. The seat back frame assembly according to claim 1, wherein said center portion is positioned below the lower zigzag spring.

3. The seat back frame assembly according to claim 1 or 2, wherein a back surface of said main connection portion is fixed to the sub-plate.

4. The seat back frame assembly according to claim 1 or 2, further comprising an armrest supporting base fixed to the main plate, wherein said armrest supporting base and said sub-connection portion are overlapped with each other in the front-and-back direction.

5. The seat back frame assembly according to claim 3, further comprising an armrest supporting base fixed to the main plate, wherein said armrest supporting base and said sub-connection portion are overlapped with each other in the front-and-back direction.

* * * * *